US009223550B1

(12) United States Patent
Bastien et al.

(10) Patent No.: US 9,223,550 B1
(45) Date of Patent: Dec. 29, 2015

(54) PORTABLE HANDLING OF PRIMITIVES FOR CONCURRENT EXECUTION

(71) Applicant: Google Inc., Mountain View, CA (US)

(72) Inventors: Jean-Francois Bastien, Mountain View, CA (US); David C. Sehr, Cupertino, CA (US)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 14/056,091

(22) Filed: Oct. 17, 2013

(51) Int. Cl.
*G06F 9/44* (2006.01)
*G06F 9/45* (2006.01)

(52) U.S. Cl.
CPC .. *G06F 8/40* (2013.01); *G06F 8/20* (2013.01); *G06F 8/456* (2013.01)

(58) Field of Classification Search
CPC ............... G06F 8/61; G06F 8/70; G06F 8/71; G06F 9/4443; G06F 8/65; G06F 8/456; G06F 8/20; G06F 8/40; G06Q 20/102; G06Q 20/32; G06Q 20/325
See application file for complete search history.

(56) References Cited

U.S. PATENT DOCUMENTS

| 6,282,702 | B1 | 8/2001 | Ungar | |
|---|---|---|---|---|
| 8,060,857 | B2 * | 11/2011 | Biggerstaff | G06F 8/456 717/106 |
| 8,136,102 | B2 * | 3/2012 | Papakipos | G06F 8/456 717/136 |
| 8,418,179 | B2 * | 4/2013 | Papakipos | G06F 9/5027 717/140 |
| 8,555,242 | B2 * | 10/2013 | Chrysanthakopoulos | G06F 8/20 709/201 |
| 8,776,030 | B2 * | 7/2014 | Grover | G06F 8/456 717/136 |
| 8,843,879 | B2 * | 9/2014 | Howard | G06F 8/20 717/104 |
| 2005/0022188 | A1 * | 1/2005 | Tameshige et al. | 718/100 |
| 2007/0271547 | A1 * | 11/2007 | Gulko | G06F 8/451 717/106 |
| 2009/0259828 | A1 * | 10/2009 | Grover | G06F 8/456 712/220 |
| 2012/0066664 | A1 * | 3/2012 | Howard | G06F 8/20 717/106 |
| 2012/0216015 | A1 * | 8/2012 | Mitra | 712/28 |
| 2013/0339928 | A1 * | 12/2013 | Trofin et al. | 717/122 |

OTHER PUBLICATIONS

Schwinghammer et al., Correctly translating concurrency primitives, Aug. 2009, 12 pages.*
Li et al., Combining events and threads for scalable network services implementation and evaluation of monadic, application-level concurrency primitives, Jun. 2007, 11 pages.*
"Atomic Built-Ins—Using the GNU Compiler Collection (GCC)," downloaded from the internet on Aug. 8, 2013, 2 pages, http://gcc.gnu.org/onlinedocs/gcc-4.3.5/gcc/Atomic-Builtins.html.

(Continued)

*Primary Examiner* — Thuy Dao
(74) *Attorney, Agent, or Firm* — Fish & Richardson P.C.

(57) ABSTRACT

Methods, systems, and apparatus, including computer programs encoded on a computer storage medium, for generating portable concurrency primitives. In one aspect, a method includes receiving a set of source code for a module that will execute on a plurality of different types of architectures, the set of source code including a first set of concurrency primitives, generating a second set of concurrency primitives from the first set of concurrency primitives, wherein each concurrency primitive in the second set is different than the corresponding concurrency primitive from the first set of concurrency primitives, each concurrency primitive in the second set of concurrency primitives being independent of a plurality of different types of architectures that will execute the module, and storing each concurrency primitive from the second set of concurrency primitives in a portable executable that retains the language level constructs of the first set of concurrency primitives.

19 Claims, 3 Drawing Sheets

(56) References Cited

OTHER PUBLICATIONS

"C11 (C Standard Revision)," from Wikipedia, the free encyclopedia, downloaded from the Internet on Aug. 8, 2013, 4 pages, http://en.wikipedia.org/wiki/C11_(C_standard_revision).

"Compiler," from Wikipedia, the free encyclopedia, downloaded from the internet on Aug. 9, 2013, 10 pages, https://en.wikipedia.org/wiki/Compiler.

"Inline Assembler," from Wikipedia, the free encyclopedia, downloaded from the Internet on Aug. 9, 2013, 3 pages, http://en.wikipedia.org/wiki/Inline_assembler.

"Intermediate Language," from Wikipedia, the free encyclopedia, downloaded from the internet on Aug. 12, 2013, 3 pages, https://en.wikipedia.org/wiki/Intermediate_representation.

"Intrinsic Function," from Wikipedia, the free encyclopedia, downloaded from the internet on Aug. 9, 2013, 2 pages, http://en.wikipedia.org/wiki/Builtin_function.

"Memory Model (Programming)," From Wikipedia, the free encyclopedia, downloaded from the internet on Aug. 9, 2013, 2 pages, http://en.wikipedia.org/wiki/Memory_model_(computing).

"Pivot Language," From Wikipedia, the free encyclopedia, downloaded from the internet on Aug. 12, 2013, 3 pages, https://en.wikipedia.org/wiki/Pivot_language.

"asm.js," From Wikipedia, the free encyclopedia, Jun. 11, 2015, downloaded from the interne on Jun. 15, 2015, 6 pages, https://en.wikipedia.org/wiki/Asm.js.

"Fat Binary," From Wikipedia, the free encyclopedia, May 25, 2015, downloaded from the internet on May 26, 2015, 5 pages, https://en.wikipedia.org/wiki/Fat_binary.

\* cited by examiner

PORTABLE HANDLING OF PRIMITIVES FOR CONCURRENT EXECUTION

BACKGROUND

This specification relates to code translation.

Concurrency primitives may be included in different portions of programs, e.g., as threads, or different programs, e.g., processes, and may allow the portions of programs and programs to have overlapping lifetimes and make forward progress during the same time period. For example, a processor may execute concurrency primitives using time slicing or multiple processors may execute concurrency primitives in parallel. A concurrency primitive may include a single processor instruction or multiple processor instructions.

SUMMARY

In general, one innovative aspect of the subject matter described in this specification can be embodied in methods that include the actions of receiving a set of source code for a module that will execute on a plurality of different types of architectures, the set of source code including a first set of concurrency primitives, each concurrency primitive in the first set of concurrency primitives defining a language level construct, generating a second set of concurrency primitives from the first set of concurrency primitives, wherein each concurrency primitive in the second set corresponds to one of the concurrency primitives from the first set of concurrency primitives and is different than the corresponding concurrency primitive from the first set of concurrency primitives while maintaining the language level constructs of, and being a lower level representation of, the corresponding concurrency primitive from the first set of concurrency primitives, each concurrency primitive in the second set of concurrency primitives being independent of a plurality of different types of architectures that will execute the module, and storing each concurrency primitive from the second set of concurrency primitives in a portable executable that retains the language level constructs of the first set of concurrency primitives. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. In some implementations, generating machine independent concurrency primitives for an executable allows portability of the executable between different architectures. In some implementations, transformation of machine independent concurrency primitives into machine dependent concurrency primitives prior to execution of the concurrency primitives increases efficiency, e.g., of the execution process and/or the translation process. In some implementations, a developer may create and maintain a single set of program code that will be executed on different architectures rather than creating and maintaining different sets of code for different architectures.

In some implementations, a development system may provide a translation of the machine independent concurrency primitives to a requesting device based on the architecture of the device. In some implementations, updated development system components may be deployed to leverage new programming languages and/or architectures, e.g., hardware or software architectures, without requiring developers to modify existing application code used to generate portable executables. In some implementations, performance improvements to code generation may be implemented, by providing a new optimizer, generator, or architecture specific translator, without requiring developers to modify existing application code used to generate portable executables.

In some implementations, translation of concurrency primitives into architecture dependent concurrency primitives may take advantage of the operating system's capabilities, e.g., special system calls, or implementation details, e.g. memory management characteristics, to provide better performance. In some implementations, when an application with concurrency primitives will only run on a single core architecture or a single threaded architecture and not require synchronization primitives, the concurrency primitives can be removed during translation into architecture dependent primitives, e.g., the concurrency primitives can be translated into non-concurrency primitives. In some implementations, a system may evaluate contention of resources and select a translation strategy based on whether or not a resource contention was identified. In some implementations, a system may use its knowledge of an application's concurrency to effectively use special hardware resources, e.g. coprocessors, and/or distribute work among multiple distributed computers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

A development system receives source code from a developer's computer and generates architecture independent concurrency primitives for the concurrency primitives in the source code to create an architecture independent portable executable that is provided to end user devices. When an end user device receives the architecture independent portable executable, the end user device translates the architecture independent concurrency primitives into architecture dependent concurrency primitives prior to execution of the executable.

The generation of the architecture independent concurrency primitives maintains the language level constructs of the concurrency primitives in the source code. For example, the development system may change a token included in a concurrency primitive or the syntax of a concurrency primitive while maintaining the overall structure of the concurrency primitive. The development system may maintain the language level constructs to increase the portability of the architecture independent portable executable.

The end user device may translate the concurrency primitives into architecture dependent concurrency primitives or architecture concurrency characteristics. For example, a first architecture may allow atomic operations and the use of concurrency primitives while a second architecture may use concurrency characteristics, such as lock-free atomic loads and stores.

In some implementations, the generation of the architecture independent portable executable and architecture dependent translation of the concurrency primitives allow the development system to receive code written in a new language, or provide an architecture independent portable executable to a new architecture. For example, the development system may receive a new generator that creates architecture independent concurrency primitives from code written in the new language. In some examples, the development system may receive a new translator that translates architecture independent concurrency primitives into concurrency primitives specific to the new architecture. The development system receives the new generator or the new translator and does not require changes to other parts of the development system, e.g., associated with other programming languages or architectures.

§1.1 Example Operating Environment

Figure 1A:
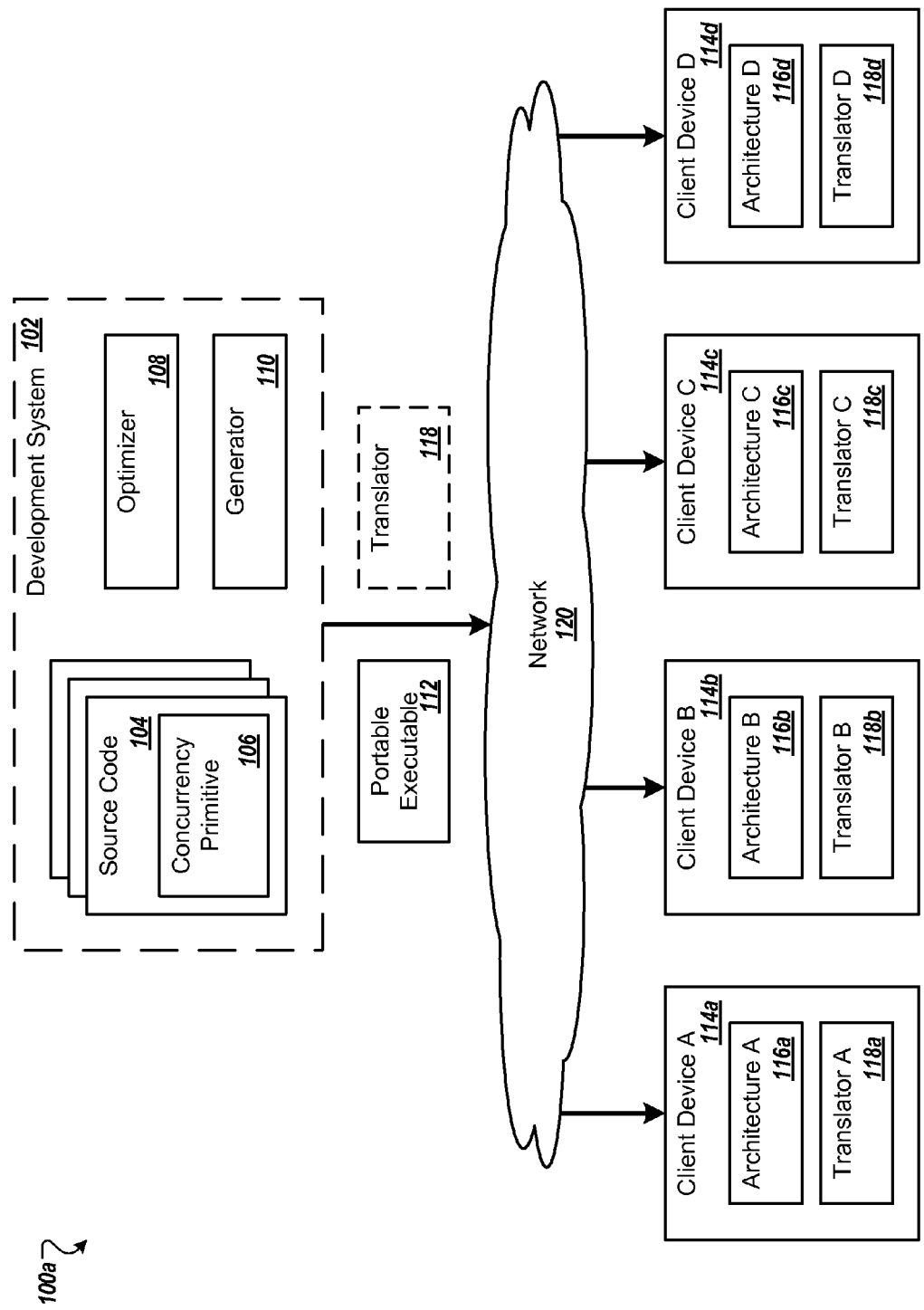
FIGS. 1A-B are block diagrams of example environments for generating an architecture independent portable executable that includes concurrency primitives.

FIG. 1A is a block diagram of an example environment 100a for generating an architecture independent portable executable that includes concurrency primitives. The environment 100a includes a development system 102 that receives source code 104 from a developer and generates architecture independent concurrency primitives for each concurrency primitive 106 included in the source code 104. The development system stores the architecture independent concurrency primitives in a portable executable 112 and provides the portable executable to client devices 114a-d upon request.

For example, a developer writes source code for a module, such as an application or a portion of an application, and stores the source code in one or more files. The developer then provides the files to the development system 102 using the developer's computer and the development system 102 stores the source code 104 in memory, e.g., in a hard disk drive or a solid state drive.

Each file or portion of the source code 104 includes one or more concurrency primitives 106 that may be executed by a target architecture, e.g., during execution of the module associated with the source code 104. The concurrency primitives 106 are written in a programming language, such as C, C++, or Java to name a few examples.

The development system 102 includes an optimizer 108 that may optimize one or more of the concurrency primitives 106 prior to the generation of the architecture independent concurrency primitives. For example, the optimizer 108 may determine whether one of the concurrency primitives 106 may be optimized while maintaining the language level constructs of the concurrency primitive and the architecture independence of the optimized concurrency primitives. For example, the optimizer 108 may optimize other primitives included in the source code 104 while leaving the concurrency primitives untouched.

In some examples, the optimizer 108 determines whether one or more of the concurrency primitives, e.g., in the source code 104 or an internal representation, may be represented in a more efficient manner, e.g., with other concurrency primitives, where execution of code associated with the other concurrency primitives is more efficient than the original concurrency primitives. The optimizer 108 then replaces the original concurrency primitives with the other concurrency primitives where the result of execution of code associated with the other concurrency primitives is the same as the result of execution of code associated with the original concurrency primitives and the other concurrency primitives are architecture independent.

A generator 110 receives the concurrency primitives 106, and any optimized concurrency primitives, and generates a set of architecture independent concurrency primitives that are a lower level representation of the concurrency primitives 106. The generator 110 then stores the architecture independent concurrency primitives in a portable executable 112, e.g., that is stored in a memory of the development system 102.

The development system 102 generates architecture independent concurrency primitives for any programming language by using a programming language specific optimizer 108 and a programming language specific generator 110. For example, the development system 102 may have a C programming language generator, a C++ programming language optimizer, and a C++ programming language generator, in addition to optimizers 108 and generators 110 for other programming languages. In some examples, the development system 102 may have a C programming language optimizer and generator and a C++ programming language optimizer and generator.

When one of the client devices 114a-d requests the module associated with the portable executable 112, and the source code 104, the development system 102 provides the portable executable 112 to the requesting client device 114a-d where the portable executable 112 is independent of the architectures 116a-d of the client devices 114a-d. For example, the portable executable 112 does not include any primitives that are specific to a particular architecture that will execute the portable executable 112, or the module associated with the portable executable, and the same portable executable 112 is provided to all of the client devices 114a-d upon request independent of differences between the architectures 116a-d. The portable executable 112 contains higher level primitives that will be translated into lower level machine dependent primitives executed by a target architecture.

The receiving client device 114a-d then translates the architecture independent concurrency primitives from the portable executable 112 into architecture specific concurrency primitives using a translator 118a-d that corresponds with the architecture 116a-d of the client device 114a-d. Each translation for an architecture is specific to that architecture, and is thus different from translations to other architectures. In some examples, when the translator 118a determines that the architecture 116a includes a single processor, the translator 118a may determine that the architecture specific concurrency primitives do not need to have barriers as multiple processors will not access the same data at substantially the same time.

For example, the client device A 114a may request a module from the development system 102 for presentation of content in a web application. The development system 102 determines that the portable executable 112 includes the code that upon execution will present the content for the module, determines that the client device A 114a has the architecture A 116a, and identifies a translator for devices with the architecture A 116a. The development system 102 then sends an architecture specific translator 118, e.g., the translator A 118a, to the client device A 114a with the portable executable 112, and the client device A 114a uses the translator A 118a to translate the architecture independent concurrency primitives from the portable executable 112 into concurrency primitives specific to the architecture A 116a.

The development system 102 may send the portable executable 112 to the client devices 114a-d across a network 120. The network 120, such as a local area network (LAN), wide area network (WAN), the Internet, or a combination thereof, connects the client devices 114a-d and the development system 102. The client devices 114a-d may include personal computers, mobile communication devices, and other devices that can send and receive data over the network 120.

§1.2 Generation and Transformation of Concurrency Primitives

The following is an example of first concurrency primitives included in source code, the generation of second concurrency primitives from the first concurrency primitives, and the transformation of the second concurrency primitives into third concurrency primitives. The following is intended to show one example of the creation of an architecture independent portably executable and the third concurrency primitives. Any appropriate algorithm may be used to generate the second concurrency primitives, to generate the architecture independent portable executable, and/or to transform the second concurrency primitives into the third concurrency primitives.

A first example of the source code 104 that includes a concurrency primitive for an application written in the C programming language is shown below in Table 1. In this example, the "while" loop contains the concurrency primitive "__sync_bool_compare_and_swap". The code shown in Table 1 is one example of a set of source code for a module that will execute on a plurality of different types of architectures where the set of source code includes a first set of concurrency primitives and each concurrency primitive in the first set of concurrency primitives defines a language level construct.

TABLE 1 struct Node { struct Node *next; } node0, *node1, *node2;
// . . .
while (!__sync_bool_compare_and_swap(&node0.next, node1, node2));

A second example of the same portion of the application but written in the C++ programming language is shown below in Table 2. In this example, the "while" loop contains the concurrency primitives "std::atomic" and "compare exchange strong". The code shown in Table 2 is another example of a set of source code for a module that will execute on a plurality of different types of architectures where the set of source code includes a first set of concurrency primitives and each concurrency primitive in the first set of concurrency primitives defines a language level construct.

TABLE 2 struct Node { std::atomic<Node *> next; } node0, *node1, *node2;
// . . .
while (!node0.next.compare_exchange_strong(node1, node2));

After the development system 102 receives the first example or the second example of the source code 104, the development system 102 may store an internal representation of the concurrency primitives in memory, such as the "cmpxchg" concurrency primitive shown in the "while" loop in Table 3 below. In some implementations, the internal representation is an LLVM representation.

In some implementations, the internal representation is a compiler's model for the application. The internal representation may correspond with a version of the compiler and may change from one version of the compiler to the next. The internal representation may allow the compiler to analyze the application and is initially an unoptimized representation of an application, e.g., the C or C++ application code above. An optimizer may modify the internal representation into an optimized internal representation.

TABLE 3 while.cond:
　%0 = load %"Node"** @_node1, align 4
　%1 = ptrtoint %"Node"* %0 to i32
　%2 = load %"Node"** @_node2, align 4
　%3 = ptrtoint %"Node"* %2 to i32
　%4 = cmpxchg i32* bitcast (%"Node"* @_node0 to i32*),
　　i32 %1, i32 %3 seq_cst
　%lnot = icmp eq i32 %4, %1
　br i1 %lnot, label %while.end, label %while.cond
while.end:

The generator 110 may use the internal representation to generate architecture independent concurrency primitives for the while loop, such as the concurrency primitive "cmpxchg" shown in Table 4 below, and store the architecture independent concurrency primitives in the portable executable 112. The code shown in Table 4 is one example of a second set of concurrency primitives that was generated from the first set of concurrency primitives, where each concurrency primitive in the second set corresponds to one of the concurrency primitives from the first set of concurrency primitives and is different than the corresponding concurrency primitive from the first set of concurrency primitives while maintaining the language level constructs of, and being a lower level representation of, the corresponding concurrency primitive from the first set of concurrency primitives. Each concurrency primitive in the second set of concurrency primitives is independent of a plurality of different types of architectures that will execute the module.

In some implementations, the internal representation expresses optimizations and architecture targets that a compiler currently supports. As the compiler evolves, more optimizations may be implemented and more targets may be supported. The generator 110 may create the architecture independent concurrency primitives for the portable executable 112 to isolate the portable executable from changes to compilers. In some implementations, the architecture independent concurrency primitives may represent forecasts of how a compiler's internal representation may change to isolate the architecture independent concurrency primitives from the changes.

TABLE 4 while.cond:
　%0 = load %"Node"** @_node1, align 4
　%1 = ptrtoint %"Node"* %0 to i32
　%2 = load %"Node"** @_node2, align 4
　%3 = ptrtoint %"Node"* %2 to i32
　%4 = call i32 @llvm.nacl.atomic.cmpxchg.i32(i32* bitcast %"Node"*
　　@_node0 to i32*), i32 %1, i32 %3, i32 6, i32 6)
　%lnot = icmp eq i32 %4, %1
　br i1 %lnot, label %while.end, label %while.cond
while.end:

The generator 110 may then receive a request for the module associated with the portable executable 112 and provide the portable executable 112 in response to the request. For example, the client device A 114a may have an x86 architecture and request the portable executable 112 to present content to an operator of the client device A 114a.

After receiving the portable executable 112, the client device A 114a uses the translator A 118a specific to the x86 architecture to translate the architecture independent concurrency primitives from the portable executable 112 into architecture dependent concurrency primitives, e.g., for the x86 architecture. For example, given the architecture independent concurrency primitives in Table 4 above, the translator A 118a may generate the x86 architecture dependent concurrency primitives shown in Table 5 below. In this example, Table 5 includes the concurrency primitive "lock cmpxchgl" and "movl" is atomic. The code shown in Table 5 is one example of a third set of concurrency primitives created by transforming each concurrency primitive in the second set of concurrency primitives into a different concurrency primitive to generate a third set of concurrency primitives where each of the concurrency primitives from the third set of concurrency primitives specific to the target architecture (e.g., an x86 architecture).

TABLE 5

| | | |
|---|---|---|
| .LBB0_1: | | |
| | movl | _node2, %edx |
| | movl | _node1, %ecx |
| | movl | %ecx, %eax |
| | lock | |
| | cmpxchgl | %edx, _node0 |
| | cmpl | %ecx, %eax |
| | jne | .LBB0_1 |

In some examples, when the client device B 114b has an ARM architecture, the translator B 118b translates the architecture independent concurrency primitives shown in Table 4 above into the ARM architecture dependent concurrency primitives, shown in Table 6 below, after the client device B 114b receives the portable executable 112. In this example, Table 6 includes the concurrency primitives "ldrex" (load exclusive), "strex" (store exclusive), and "dmb" (data memory barrier), and "ldr" (load) is atomic. The code shown in Table 6 is another example of a third set of concurrency primitives created by transforming each concurrency primitive in the second set of concurrency primitives into a different concurrency primitive to generate a third set of concurrency primitives where each of the concurrency primitives from the third set of concurrency primitives specific to the target architecture (e.g., an ARM architecture).

TABLE 6

| | | |
|---|---|---|
| | ldr | r3, [r12] |
| | b | .LBB1_2 |
| .LBB1_1: | | |
| | cmp | r0, r3 |
| | dmb | ish |
| | str | r3, [r12] |
| | popeq | {r4, pc} |
| .LBB1_2: | | |
| | ldr | r1, [lr] |
| | mov | r0, r3 |
| | dmb | ish |
| .LBB1_3: | | |
| | ldrex | r3, [r2] |
| | cmp | r3, r0 |
| | bne | .LBB1_1 |
| @ BB#4: | | |
| | strex | r4, r1, [r2] |
| | cmp | r4, #0 |
| | bne | .LBB1_3 |
| | b | .LBB1_1 |

The environment 100a supports additional architectures with a translator for each architecture. For example, the development system 102 stores architecture specific translators in memory and provides the translators to the client devices 114a-d after receiving a request for a portable executable.

When a new architecture is developed, a new translator is created for the new architecture and stored in memory to allow the development system 102 to provide the portable executable 112 to client devices that have the new architecture. The new architecture may be an architecture that was recently created or an architecture that was not previously supported by the development system 102. For example, an architecture that was not previous supported may include an architectural extension, e.g., x86's addition of transaction memory and lock elision.

The architectures 116a-d are hardware and/or software specific. For example, a hardware specific architecture may include a specific processor, family of processors, machine level instruction set, or bus size. In some examples, a software specific architecture may include a specific operating system, a specific application, or a specific driver.

§1.3 Example Server Side Translation Operating Environment

Figure 1B:
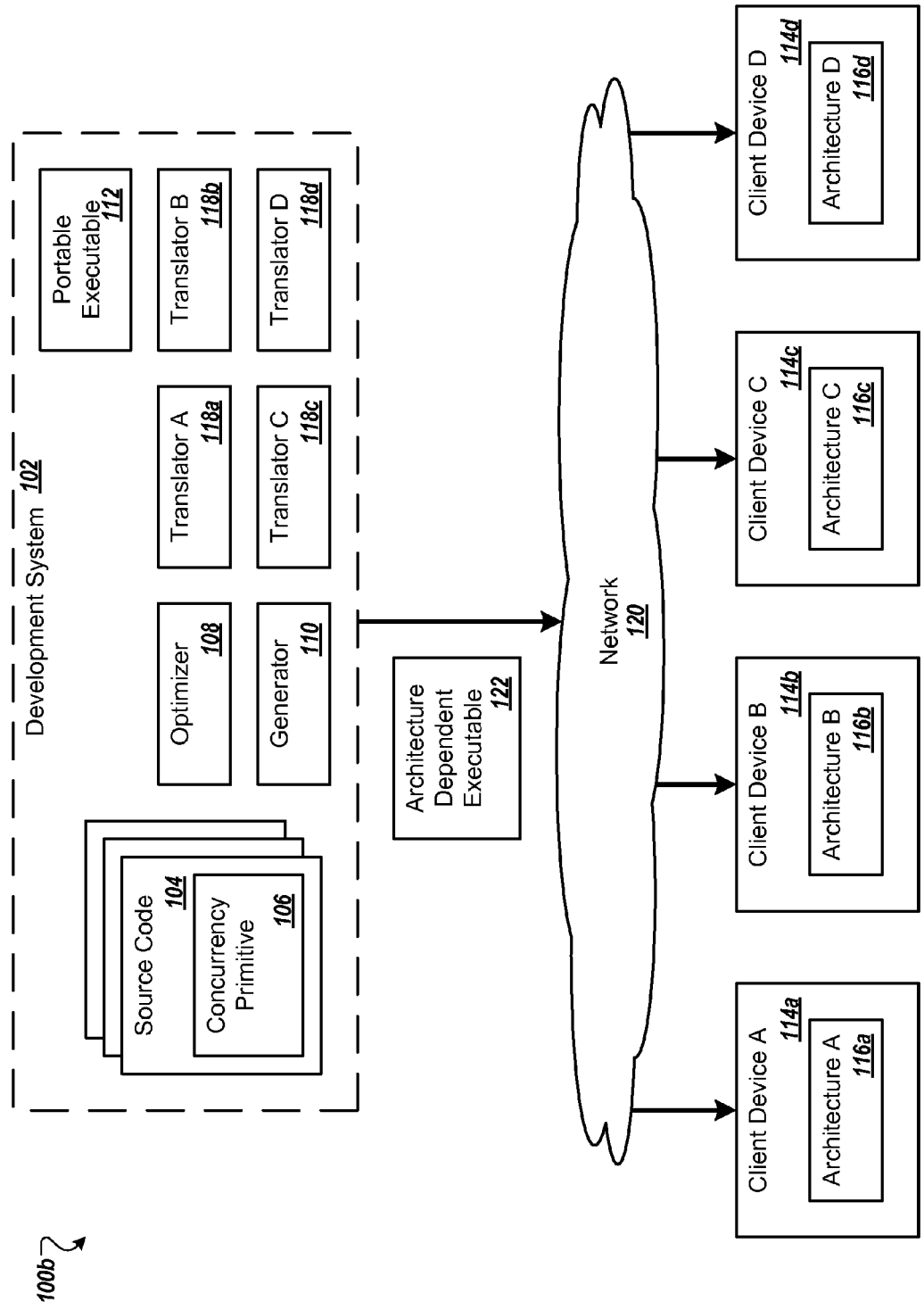

FIG. 1B is another block diagram of an example environment 100b generating an architecture independent portable executable that includes concurrency primitives. The environment 100b is similar to the environment 100a except that the development system 102 translates the architecture independent concurrency primitives using the translators 118a-d to generate architecture dependent executables 122 and provides the architecture dependent executables 122 to the client devices 114a-d upon request.

For example, the development system 102 generates the portable executable 112 with the generator 110 and stores the portable executable 112 in memory. The portable executable 112 may be stored in memory to allow new translators that are added to the development system 102 to translate the concurrency primitives in the portable executable 112 without generating the portable executable 112 again.

The translators 118a-d then translate the architecture independent concurrency primitives stored in the portable executable 112 into architecture dependent concurrency primitives, create corresponding architecture dependent executables 122 with the architecture dependent concurrency primitives, and store the architecture dependent executables 122 in memory, e.g., the same memory that includes the portable executable 112 or a different memory.

When the development system 102 receives a request for a module from one of the client devices 114a-d, the development system 102 determines the architecture of the requesting client device, and the architecture dependent executable corresponding to the requested module and the architecture of the requesting client. The development system 102 then provides the determined architecture dependent executable to the client device that sent the module request to the development system 102 using the network 120.

The translators 118a-d may translate the concurrency primitives in the portable executable 112 immediately after generation of the portable executable 112. In some examples, the translators 118a-d translate the concurrency primitives in the portable executable 112 after the development system 102 receives a request for the module associated with portable executable from one of the client devices 114a-d. For example, when the development system 102 receives a request from the client device A 114a, the translator A 118a generates the architecture dependent executable 122 and the development system 102 provides the architecture dependent executable 122 to the client device A 114a.

In some implementations, the development system 102 does not provide an architecture specific translator 118 to a client device that requested a module from the development system 102. For example, the development system 102 may provide the architecture dependent executable 122 to the requesting client device 114a-d without providing one of the translators 118a-d. In some examples, the development system 102 determines that the requesting client device 114a-d already has an architecture specific translator stored in memory and provides the portable executable 112 to the requesting client device without providing one of the translators 118a-d. In some examples, the development system provided the architecture specific translator 118 to the client device D 114d in response to a previous request for a portable executable and does not provide the architecture specific translator 118 to the client device D 114d with the portable executable 112.

In some implementations, the development system 102 provides the architecture specific translator 118 to a client device without an executable. For example, the development system 102 may provide the architecture specific translator 118 to the client device C 114c the first time the client device C 114c connects to the development system 102.

In some implementations, a client device may receive a new architecture specific translation 118 in a portable executable. For example, the client device may have a first architecture specific translator and may receive a new architecture specific translator in the portable executable 112. The client device uses the first architecture specific translator to translate the primitives in the portable executable 112 and generate the new architecture specific translator where the new architecture specific translator includes concurrency primitives that are optimized for a target architecture during the translation process.

In some implementations, the development system 102 is implemented across multiple computers. For example, a first computer may execute the optimizer 108 and a second computer may execute the generator 110. In some examples, the source code 104 is stored in a memory on a developer's computer.

§2.0 Example Process Flow

Figure 2:
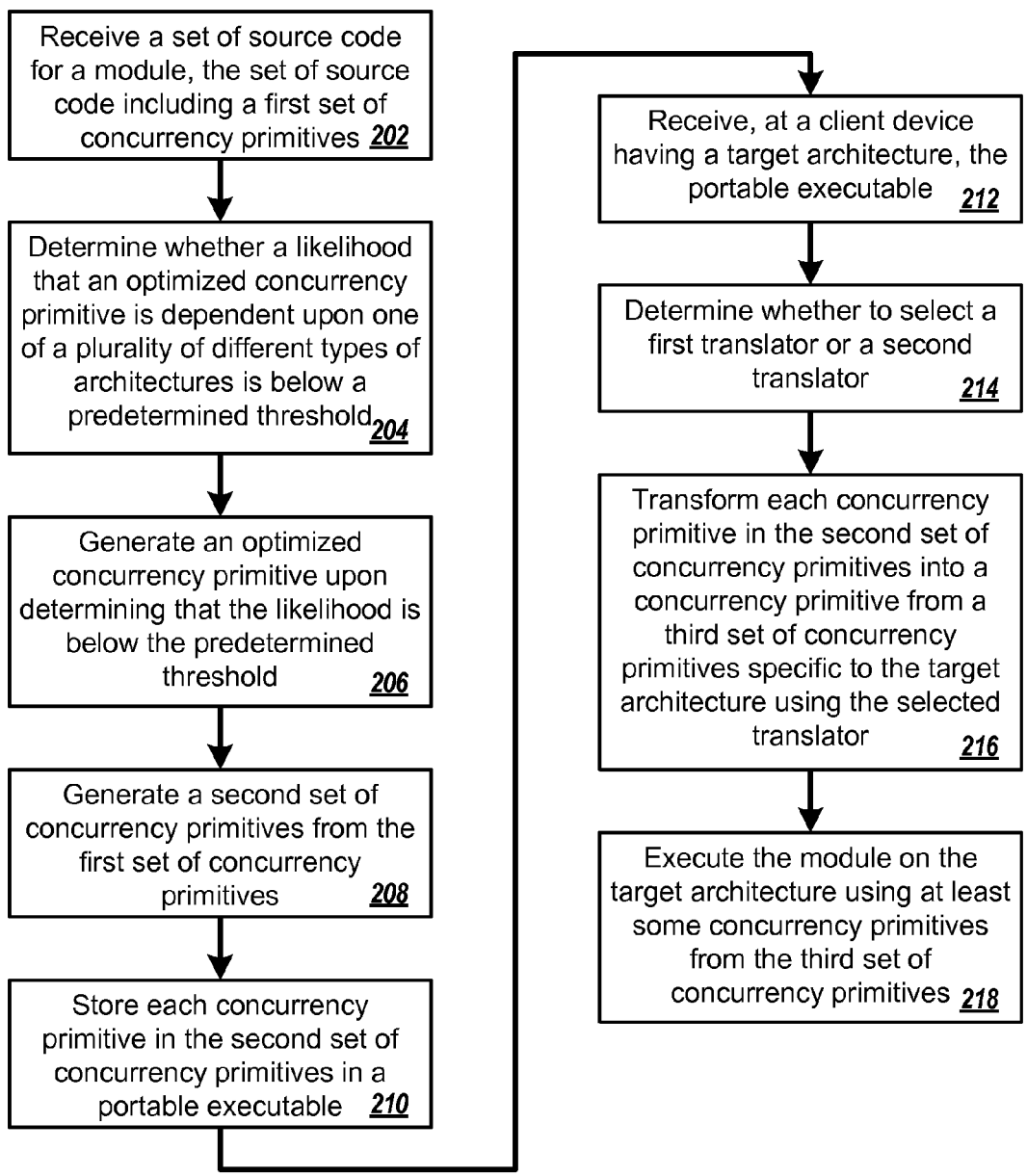
FIG. 2 is a flow diagram of a process for generating a portable executable.

FIG. 2 is a flow diagram of a process 200 for generating a portable executable. For example, the process 200 can be used by the development system 102 and the client device A 114a from the environment 100a.

The process receives a set of source code for a module, the set of source code including a first set of concurrency primitives (202). Each concurrency primitive in the first set of concurrency primitives defines a language level construct. For example, the development system receives the source code from a developer's computer.

The module may be an application or a portion of an application. For example, the source code may be code for the portion of an application, such as a search algorithm that relies on a concurrent index or a module for computationally intensive tasks, e.g., a game engine that performs physics and/or artificial intelligence computations.

The source code may include other content in addition to the first set of concurrency primitives. For example, the source code may include variable definitions, comments, and non-concurrency primitives.

In some examples, each of the primitives in the first set of primitives is a high level primitive.

The process determines whether a likelihood that an optimized concurrency primitive is dependent upon one of a plurality of different types of architectures is below a predetermined threshold (204). For example, the development system identifies a concurrency primitive that can be optimized prior to generation of the architecture independent concurrency primitives and determines the likelihood that the optimized concurrency primitive will be architecture dependent.

The process generates an optimized concurrency primitive upon determining that the likelihood is below the predetermined threshold (206). For example, the development system generates the optimized concurrency primitive when the development system determines that the optimized concurrency primitive is not specific to any particular architecture or that the optimization of the concurrency primitive is based on assumptions that are usually true, e.g., based on the predetermined threshold.

The process generates a second set of concurrency primitives from the first set of concurrency primitives (208). Each concurrency primitive in the second set corresponds to one of the concurrency primitives from the first set of concurrency primitives and is different than the corresponding concurrency primitive from the first set of concurrency primitives while maintaining the language level constructs of, and being a lower level representation of, the corresponding concurrency primitive from the first set of concurrency primitives. Each concurrency primitive in the second set of concurrency primitives is independent of a plurality of different types of architectures that will execute the module.

In some implementations, each concurrency primitive in the second set of concurrency primitives is an LLVM primitive. In some implementations, the development system generates the second set of concurrency primitives from the first set of concurrency primitives and the optimized concurrency primitives.

The process stores each concurrency primitive in the second set of concurrency primitives in a portable executable (210). The portable executable retains the language level constructs of the first set of concurrency primitives. In some implementations, the portable executable retains the language level constructs of the received source code. For example, the development system creates a package of the concurrency primitives included in the second set of concurrency primitives and the other content of the received source code or translations of the other content of the received source code.

The process receives, at a client device having a target architecture, the portable executable (212). For example, a client device requests the module associated with the portable executable and receives the portable executable from the development system in response to the request.

The process determines whether to select a first translator or a second translator (214). The first translator performs a faster transformation and generates a third set of concurrency primitives with slower data access during execution than a slower transformation performed by the second translator to generate a third set of concurrency primitives with faster data access during execution.

For example, the client device determines how the execution speed of the requested module affects the performance of the module. For example, a user interface may not be affected by execution speed as much as a physics module and the client device may select the faster transformation for the user interface and the slower transformation for the physics module or another module that performs computationally intensive tasks.

The process transforms each concurrency primitive in the second set of concurrency primitives into a concurrency primitive from a third set of concurrency primitives specific to the target architecture using the selected translator (216). Each of the concurrency primitives in the second set of concurrency primitives is different than the corresponding concurrency primitive in the third set of concurrency primitives.

For example, the client device selects the first or the second translator and uses the selected translator to transform the second set of concurrency primitives into the third set of concurrency primitives that are specific to the architecture of the client device. The determination of which translator to select may be performed using data included in the portable executable, e.g., where the client device makes the determination based on instructions in the portable executable. In some examples, the portable executable includes rules that indicate that if the properties of the client device comply with a first set of rules, the client device should select the first translator and the client device should select the second translator otherwise.

The client device or the development system may use any appropriate algorithm to determine which translator to select. In some implementations, the determination of which translator to select may be made by an operator of the client device. For example, the client device may present a prompt requesting selection for the first translator or the second translator.

The client device stores the third set of concurrency primitives in memory. For example, the client device stores the third set of concurrency primitives in a package associated with the module. The client device may or may not retain the portable executable in memory after translation of the second set of concurrency primitives into the third set of concurrency primitives.

The process executes the module on the target architecture using at least some of the concurrency primitives from the third set of concurrency primitives (218). For example, the client device receives a request for the module and executes some of the concurrency primitives from the third set of concurrency primitives.

After translation of the second set of concurrency primitives into the third set of concurrency primitives, the client device may execute the module two or more times without requiring any additional translation of the second set of concurrency primitives assuming that the code for the module remains the same.

In some implementations, when the client device executes the module, the client device uses two or more concurrency primitives from the third set of concurrency primitives at the same time. For example, the client device executes two concurrency primitives from the third set of concurrency primitives in parallel.

The order of steps in the process 200 described above is illustrative only, and generating the portable executable can be performed in different orders. For example, the development system may translate the second set of concurrency primitives into the third set of concurrency primitives prior to sending an executable to the client device where the executable contains the third set of concurrency primitives.

In some implementations, the process 200 can include additional steps, fewer steps, or some of the steps can be divided into multiple steps. For example, the development system may generate the second set of concurrency primitives without optimizing any of the concurrency primitives in the first set of concurrency primitives, e.g., perform steps 202 and 208 through 210 without performing any of the other steps in the process 200.

In some implementations, when the development system transforms the second set of concurrency primitives into the third set of concurrency primitives, the development system may transform each concurrency primitive in the second set of concurrency primitives into a concurrency primitive from the third set of concurrency primitives, where each of the concurrency primitives in the third set of concurrency primitives is specific to a target architecture from the plurality of different types of architectures. The development system may store each of the concurrency primitives in the third set of concurrency primitives in a package specific to the target architecture, receive a request from a client device for the module, where the client device has the target architecture, and provide the package of the third set of concurrency primitives to the client device.

§3.1 Additional Portable Executable Details

In some implementations, the client device receives a portable executable that includes a first set of concurrency primitives for a module without the development system storing the portable executable. For example, the development system may have previously created the portable executable. After receiving the portable executable, the client device transforms each concurrency primitive in the first set of concurrency primitives into a different concurrency primitive to generate a second set of concurrency primitives where each of the concurrency primitives from the second set of concurrency primitives specific to a target architecture from the plurality of different types of architectures, and executes the module on the target architecture using at least some of the concurrency primitives from the second set of concurrency primitives In some implementations, the development system receives high level source code that includes the first set of concurrency primitives and converts the high level code into an intermediate language. For example, the development system converts the source code into the intermediate representation shown in Table 3 above.

In some implementations, the development system transforms one or more of the concurrency primitives into a non-human readable form when storing the concurrency primitives in the portable executable or in the architecture dependent executable. For example, the development system may compress and/or encrypt one or more of the concurrency primitives.

In some implementations, transforming each concurrency primitive in the second set into a different concurrency primitive to generate the third set of concurrency primitives is performed within a predetermined time prior to executing the module on the target architecture. For example, the client device may translate the second set of concurrency primitives upon receiving the portable executable. In some examples, the client device translates the second set of concurrency primitives upon receiving a request to execute the module associated with the portable executable.

In some implementations, when the client device translates the second set of concurrency primitives into the third set of concurrency primitives, the client device optimizes at least one concurrency primitive from the second set for use with the target architecture of the client device when generating a corresponding concurrency primitive in the third set of concurrency primitives.

In some implementations, each concurrency primitive in the third set of concurrency primitives is a low level concurrency primitive used directly by a target processor included in the target architecture. For example, one or more of the concurrency primitives in the third set of concurrency primitives includes architecture specific instructions.

In some implementations, a client device may evaluate, statically or at runtime, contention of resources, such as locks, and select a translation strategy based on whether or not a resource contention was identified. For example, the client device may select a translation strategy, e.g., spinlock, speculative lock elision, work queue, etc., depending on the identification of a resource contention.

In some implementations, the portable executable may be translated each time a request to execute the corresponding application is received. For example, a translation strategy may be used for the first translation and subsequent translations or a different translation strategy may be used for subsequent translations. When the client device identifies a resource contention, the client device may determine that the portable executable should be translated each time the client device receives a request to execute the corresponding application.

In some examples, the client device may choose an appropriate translation strategy while the code for the application is executing. For example, the client device may translate a subset of the primitives from the portable executable that do not include concurrency primitives prior to the execution of the application and may translate the concurrency primitives during execution of the application. The same translation of the non-concurrency primitives may be used for each execution of the application while some of the concurrency primitives are translated dynamically at runtime.

§3.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving a set of source code for a module that will execute on a plurality of different types of architectures, the set of source code including a first set of concurrency primitives, each concurrency primitive in the first set of concurrency primitives defining a language level construct and allowing concurrent execution of different portions of the module;

generating a second set of concurrency primitives from the first set of concurrency primitives, wherein each concurrency primitive in the second set corresponds to one of the concurrency primitives from the first set of concurrency primitives and is different than the corresponding concurrency primitive from the first set of concurrency primitives while maintaining the language level constructs of, and being a lower level representation of, the corresponding concurrency primitive from the first set of concurrency primitives, each concurrency primitive in the second set of concurrency primitives being independent of a plurality of different types of architectures that will execute the module and allowing concurrent execution of different portions of the module;

storing each concurrency primitive from the second set of concurrency primitives in a portable executable that retains the language level constructs of the first set of concurrency primitives;

transforming each concurrency primitive in the second set of concurrency primitives into a concurrency primitive from a third set of concurrency primitives, each of the concurrency primitives in the third set of concurrency primitives specific to a target architecture from the plurality of different types of architectures and allowing concurrent execution of different portions of the module;

storing each of the concurrency primitives in the third set of concurrency primitives in a package specific to the target architecture;

receiving a request from a client device for the module;

determining that the client device has the target architecture; and providing the package of the third set of concurrency primitives to the client device in response to determining that the client device has the target architecture.

2. The method of claim 1, wherein transforming each concurrency primitive in the second set of concurrency primitives into a concurrency primitive from a third set of concurrency primitives comprises:

determining whether to select a first translator or a second translator to generate the third set of concurrency primitives, wherein the first translator performs a faster transformation and generates the third set of concurrency primitives with slower data access during execution than a slower transformation performed by the second translator to generate the third set of concurrency primitives with faster data access during execution;

selecting, based on the determining, the first translator or the second translator; and transforming each concurrency primitive in the second set to generate the third set of concurrency primitives using the selected translator.

3. The method of claim 1:

further comprising generating, for a particular concurrency primitive from the first set, an optimized concurrency primitive that is more efficient than the particular concurrency primitive and that, upon execution of the optimized concurrency primitive, produces the same result as execution of the particular concurrency primitive, wherein generating the second set of concurrency primitives from the first set of concurrency primitives comprises generating the second set of concurrency primitives from the first set of concurrency primitives and the optimized concurrency primitive.

4. The method of claim 3, wherein:

generating the optimized concurrency primitive comprises determining whether a likelihood that the optimized concurrency primitive being dependent upon one of the plurality of different types of architectures that will execute the module is below a predetermined threshold; and generating the second set of concurrency primitives from the first set of concurrency primitives and the optimized concurrency primitive is based on determining that the likelihood of the optimized concurrency primitive being dependent upon one of the plurality of different types of architectures that will execute the module is below the predetermined threshold.

5. A method comprising:

receiving a portable executable comprising a first set of concurrency primitives for a module, each concurrency primitive in the first set of concurrency primitives different from and generated from a higher level concurrency primitive while maintaining a set of language level constructs of the higher level concurrency primitives, independent of a plurality of different types of architectures that will execute the module, and allowing concurrent execution of different portions of the module;

transforming each concurrency primitive in the first set of concurrency primitives into a different concurrency primitive to generate a second set of concurrency primitives, each of the concurrency primitives from the second set of concurrency primitives specific to a target architecture from the plurality of different types of architectures and allowing concurrent execution of different portions of the module, wherein transforming each concurrency primitive in the first set of concurrency primitives into a different concurrency primitive to generate a second set of concurrency primitives is performed within a predetermined time prior to executing a module corresponding with the portable executable on the target architecture; and executing the module on the target architecture using at least some of the concurrency primitives from the second set of concurrency primitives.

6. The method of claim 5, wherein transforming each concurrency primitive in the first set of concurrency primitives into a different concurrency primitive to generate a second set of concurrency primitives comprises:

determining whether to select a first translator or a second translator to generate the second set of concurrency primitives, wherein the first translator performs a faster transformation and generates the second set of concurrency primitives with slower data access during execution than a slower transformation performed by the second translator to generate the second set of concurrency primitives with faster data access during execution;

selecting, based on the determining, the first translator or the second translator; and transforming each concurrency primitive in the first set to generate the second set of concurrency primitives using the selected translator.

7. A system, comprising:

a data processing apparatus; and a non-transitory computer readable storage medium in data communication with the data processing apparatus and storing instructions executable by the data processing apparatus and upon such execution cause the data processing to perform operations comprising:

receiving a set of source code for a module that will execute on a plurality of different types of architectures, the set of source code including a first set of concurrency primitives, each concurrency primitive in the first set of concurrency primitives defining a language level construct and allowing concurrent execution of different portions of the module;

generating a second set of concurrency primitives from the first set of concurrency primitives, wherein each concurrency primitive in the second set corresponds to one of the concurrency primitives from the first set of concurrency primitives and is different than the corresponding concurrency primitive from the first set of concurrency primitives while maintaining the language level constructs of, and being a lower level representation of, the corresponding concurrency primitive from the first set of concurrency primitives, each concurrency primitive in the second set of concurrency primitives being independent of a plurality of different types of architectures that will execute the module and allowing concurrent execution of different portions of the module;

storing each concurrency primitive from the second set of concurrency primitives in a portable executable that retains the language level constructs of the first set of concurrency primitives;

transforming each concurrency primitive in the second set of concurrency primitives into a concurrency primitive from a third set of concurrency primitives, each of the concurrency primitives in the third set of concurrency primitives specific to a target architecture from the plurality of different types of architectures and allowing concurrent execution of different portions of the module;

storing each of the concurrency primitives in the third set of concurrency primitives in a package specific to the target architecture;

receiving a request from a client device for the module;

determining that the client device has the target architecture; and providing the package of the third set of concurrency primitives to the client device in response to determining that the client device has the target architecture.

8. The system of claim 7, wherein transforming each concurrency primitive in the second set of concurrency primitives into a concurrency primitive from a third set of concurrency primitives comprises:
- determining whether to select a first translator or a second translator to generate the third set of concurrency primitives, wherein the first translator performs a faster transformation and generates the third set of concurrency primitives with slower data access during execution than a slower transformation performed by the second translator to generate the third set of concurrency primitives with faster data access during execution;
- selecting, based on the determining, the first translator or the second translator; and
- transforming each concurrency primitive in the second set to generate the third set of concurrency primitives using the selected translator.

9. The system of claim 7:
- the operations further comprising generating, for a particular concurrency primitive from the first set, an optimized concurrency primitive that is more efficient than the particular concurrency primitive and that, upon execution of the optimized concurrency primitive, produces the same result as execution of the particular concurrency primitive,
- wherein generating the second set of concurrency primitives from the first set of concurrency primitives comprises generating the second set of concurrency primitives from the first set of concurrency primitives and the optimized concurrency primitive.

10. The system of claim 9, wherein:
- generating the optimized concurrency primitive comprises determining whether a likelihood that the optimized concurrency primitive being dependent upon one of the plurality of different types of architectures that will execute the module is below a predetermined threshold; and
- generating the second set of concurrency primitives from the first set of concurrency primitives and the optimized concurrency primitive is based on determining that the likelihood of the optimized concurrency primitive being dependent upon one of the plurality of different types of architectures that will execute the module is below the predetermined threshold.

11. A system, comprising:
- a data processing apparatus; and
- a non-transitory computer readable storage medium in data communication with the data processing apparatus and storing instructions executable by the data processing apparatus and upon such execution cause the data processing to perform operations comprising:
  - receiving a portable executable comprising a first set of concurrency primitives for a module, each concurrency primitive in the first set of concurrency primitives different from and generated from a higher level concurrency primitive while maintaining a set of language level constructs of the higher level concurrency primitives, independent of a plurality of different types of architectures that will execute the module, and allowing concurrent execution of different portions of the module;
  - transforming each concurrency primitive in the first set of concurrency primitives into a different concurrency primitive to generate a second set of concurrency primitives, each of the concurrency primitives from the second set of concurrency primitives specific to a target architecture from the plurality of different types of architectures and allowing concurrent execution of different portions of the module, wherein transforming each concurrency primitive in the first set of concurrency primitives into a different concurrency primitive to generate a second set of concurrency primitives is performed within a predetermined time prior to executing a module corresponding with the portable executable on the target architecture; and
  - executing the module on the target architecture using at least some of the concurrency primitives from the second set of concurrency primitives.

12. The system of claim 11, wherein transforming each concurrency primitive in the first set of concurrency primitives into a different concurrency primitive to generate a second set of concurrency primitives comprises:
- determining whether to select a first translator or a second translator to generate the second set of concurrency primitives, wherein the first translator performs a faster transformation and generates the second set of concurrency primitives with slower data access during execution than a slower transformation performed by the second translator to generate the second set of concurrency primitives with faster data access during execution;
- selecting, based on the determining, the first translator or the second translator; and
- transforming each concurrency primitive in the first set to generate the second set of concurrency primitives using the selected translator.

13. A non-transitory computer readable storage medium storing instructions executable by a data processing apparatus and upon such execution cause the data processing to perform operations comprising:
- receiving a set of source code for a module that will execute on a plurality of different types of architectures, the set of source code including a first set of concurrency primitives, each concurrency primitive in the first set of concurrency primitives defining a language level construct and allowing concurrent execution of different portions of the module;
- generating a second set of concurrency primitives from the first set of concurrency primitives, wherein each concurrency primitive in the second set corresponds to one of the concurrency primitives from the first set of concurrency primitives and is different than the corresponding concurrency primitive from the first set of concurrency primitives while maintaining the language level constructs of, and being a lower level representation of, the corresponding concurrency primitive from the first set of concurrency primitives, each concurrency primitive in the second set of concurrency primitives being independent of a plurality of different types of architectures that will execute the module and allowing concurrent execution of different portions of the module;
- storing each concurrency primitive from the second set of concurrency primitives in a portable executable that retains the language level constructs of the first set of concurrency primitives;
- transforming each concurrency primitive in the second set of concurrency primitives into a concurrency primitive from a third set of concurrency primitives, each of the concurrency primitives in the third set of concurrency primitives specific to a target architecture from the plurality of different types of architectures and allowing concurrent execution of different portions of the module;

storing each of the concurrency primitives in the third set of concurrency primitives in a package specific to the target architecture;

receiving a request from a client device for the module;

determining that the client device has the target architecture; and providing the package of the third set of concurrency primitives to the client device in response to determining that the client device has the target architecture.

14. The computer readable storage medium of claim 13, wherein transforming each concurrency primitive in the second set of concurrency primitives into a concurrency primitive from a third set of concurrency primitives comprises:

determining whether to select a first translator or a second translator to generate the third set of concurrency primitives, wherein the first translator performs a faster transformation and generates the third set of concurrency primitives with slower data access during execution than a slower transformation performed by the second translator to generate the third set of concurrency primitives with faster data access during execution;

selecting, based on the determining, the first translator or the second translator; and transforming each concurrency primitive in the second set to generate the third set of concurrency primitives using the selected translator.

15. The computer readable storage medium of claim 13:

the operations further comprising generating, for a particular concurrency primitive from the first set, an optimized concurrency primitive that is more efficient than the particular concurrency primitive and that, upon execution of the optimized concurrency primitive, produces the same result as execution of the particular concurrency primitive, wherein generating the second set of concurrency primitives from the first set of concurrency primitives comprises generating the second set of concurrency primitives from the first set of concurrency primitives and the optimized concurrency primitive.

16. The computer readable storage medium of claim 15, wherein:

generating the optimized concurrency primitive comprises determining whether a likelihood that the optimized concurrency primitive being dependent upon one of the plurality of different types of architectures that will execute the module is below a predetermined threshold; and generating the second set of concurrency primitives from the first set of concurrency primitives and the optimized concurrency primitive is based on determining that the likelihood of the optimized concurrency primitive being dependent upon one of the plurality of different types of architectures that will execute the module is below the predetermined threshold.

17. A non-transitory computer readable storage medium storing instructions executable by a data processing apparatus and upon such execution cause the data processing to perform operations comprising:

receiving a portable executable comprising a first set of concurrency primitives for a module, each concurrency primitive in the first set of concurrency primitives different from and generated from a higher level concurrency primitive while maintaining a set of language level constructs of the higher level concurrency primitives, independent of a plurality of different types of architectures that will execute the module, and allowing concurrent execution of different portions of the module;

transforming each concurrency primitive in the first set of concurrency primitives into a different concurrency primitive to generate a second set of concurrency primitives, each of the concurrency primitives from the second set of concurrency primitives specific to a target architecture from the plurality of different types of architectures and allowing concurrent execution of different portions of the module, wherein transforming each concurrency primitive in the first set of concurrency primitives into a different concurrency primitive to generate a second set of concurrency primitives is performed within a predetermined time prior to executing a module corresponding with the portable executable on the target architecture; and executing the module on the target architecture using at least some of the concurrency primitives from the second set of concurrency primitives.

18. The computer readable storage medium of claim 17, wherein transforming each concurrency primitive in the first set of concurrency primitives into a different concurrency primitive to generate a second set of concurrency primitives comprises:

determining whether to select a first translator or a second translator to generate the second set of concurrency primitives, wherein the first translator performs a faster transformation and generates the second set of concurrency primitives with slower data access during execution than a slower transformation performed by the second translator to generate the second set of concurrency primitives with faster data access during execution;

selecting, based on the determining, the first translator or the second translator; and transforming each concurrency primitive in the first set to generate the second set of concurrency primitives using the selected translator.

19. The computer readable storage medium of claim 17, wherein transforming each concurrency primitive in the first set of concurrency primitives into a different concurrency primitive to generate a second set of concurrency primitives comprises:

determining whether to select a first translator or a second translator to generate the second set of concurrency primitives, wherein the first translator performs a faster transformation and generates the second set of concurrency primitives with slower data access during execution than a slower transformation performed by the second translator to generate the second set of concurrency primitives with faster data access during execution;

selecting, based on the determining, the first translator or the second translator; and transforming each concurrency primitive in the first set to generate the second set of concurrency primitives using the selected translator.

* * * * *